(12) United States Patent
Oberle

(10) Patent No.: US 8,314,706 B2
(45) Date of Patent: *Nov. 20, 2012

(54) COUPLED RADIO FREQUENCY IDENTIFICATION (RFID) AND BIOMETRIC DEVICE

(75) Inventor: Robert R. Oberle, Macungie, PA (US)

(73) Assignee: RCD Technology Corporation, Quakertown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,883

(22) Filed: Dec. 21, 2010

(65) Prior Publication Data

US 2011/0234382 A1    Sep. 29, 2011

Related U.S. Application Data

(63) Continuation-in-part of application No. 12/131,782, filed on Jun. 2, 2008, now Pat. No. 7,859,415.

(60) Provisional application No. 60/988,652, filed on Nov. 16, 2007.

(51) Int. Cl.
*G08B 13/14* (2006.01)

(52) U.S. Cl. ............... 340/572.7; 340/572.8; 340/572.4; 340/572.5

(58) Field of Classification Search .... 340/572.1–572.8, 340/10.1, 10.4; 343/731, 735, 788, 793, 343/803, 808, 895, 700 MS
See application file for complete search history.

(56) References Cited

U.S. PATENT DOCUMENTS

| | | | |
|---|---|---|---|
| 5,776,278 A | 7/1998 | Tuttle et al. | |
| 7,420,512 B2 | 9/2008 | Lannon et al. | |
| 7,859,415 B2 * | 12/2010 | Oberle | 340/572.7 |
| 2006/0066441 A1 | 3/2006 | Knadle, Jr. et al. | |
| 2006/0202835 A1 | 9/2006 | Thibault | |
| 2007/0057797 A1 | 3/2007 | Waldner et al. | |
| 2007/0090954 A1 | 4/2007 | Mahaffey | |

OTHER PUBLICATIONS

International Search Report for PCT/US08/81468, dated Jan. 6, 2009, 8 pages.

* cited by examiner

*Primary Examiner* — Anh V La
(74) *Attorney, Agent, or Firm* — Fliesler Meyer LLP

(57) ABSTRACT

A Radio Frequency Identification (RFID)-based identification device can comprise first and second RFID antennas. When first and second RFID antennas are in a first arrangement, the resonant frequencies of the antennas can be away from an interrogation frequency such that no identification information is transferred. When the first and second RFID antennas are in a second arrangement, the resonant frequency of the identification device shifts such that identification information, including biometric data, is transferred.

22 Claims, 6 Drawing Sheets

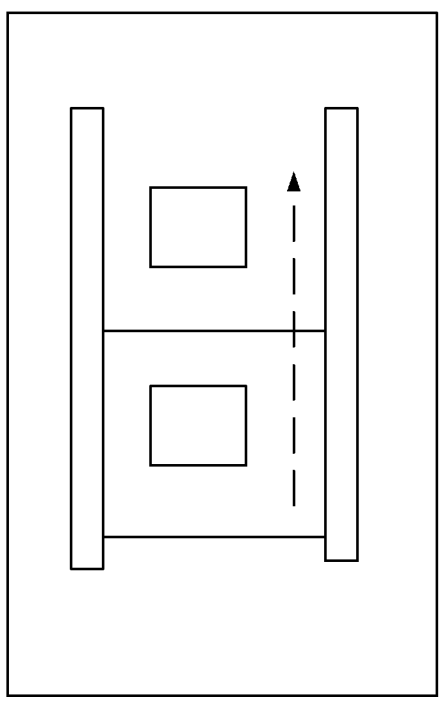 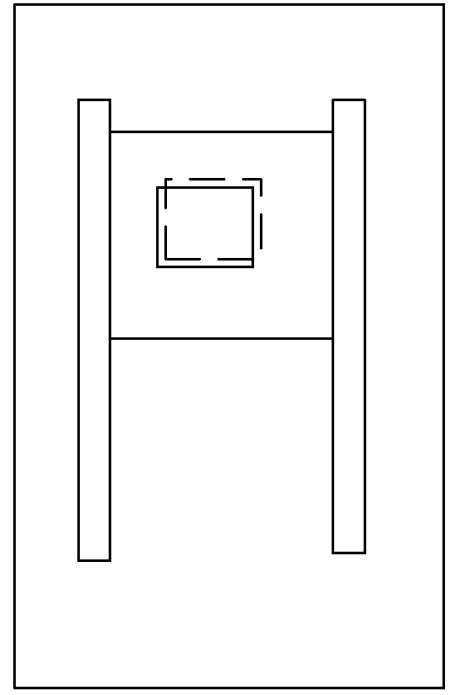
FIGURE 5A                              FIGURE 5B

COUPLED RADIO FREQUENCY IDENTIFICATION (RFID) AND BIOMETRIC DEVICE

CLAIM OF PRIORITY

This application is a continuation-in-part of U.S. Ser. No. 12/131,782, filed on Jun. 2, 2008, now U.S. Pat. No. 7,859,415, granted on Dec. 28, 2010, entitled "RFID BASED IDENTIFICATION DEVICE", which claims priority to U.S. Provisional Application No. 60/988,652 entitled "RFID BASED IDENTIFICATION DEVICE" filed Nov. 16, 2007, which is incorporated herein by reference.

BACKGROUND OF INVENTION

The present invention relates to the use of a Radio Frequency Identification (RFID) system.

The use of an RFID tag to enable a contactless transaction is well known. Contactless credit cards from vendors such as Visa, MasterCard, and American Express have been deployed for several years in the US. Further the use on an RFID device to enable venue access has been widely used for even longer. Typical examples are the use of plastic cards containing RFID devices from HID Corporation. Another well known example of the use of RFID in a personal credential is the incorporation of an RFID inlay (chip integrated with a suitably designed antenna) into a passport.

BRIEF DESCRIPTION OF THE DRAWINGS

FIGS. 5A and 5B illustrate an embodiment that operates by sliding.

DETAILED DESCRIPTION

The use of a Radio Frequency Identification (RFID) device, even one with a short read range raises issues of privacy of the user of the device. This is a particular concern for a passport since the credential necessarily carries sensitive personal information including biometric data. The biometric data can include height, weight and eye color. Other sensitive data can include citizenship and address. While the data is often secured on an RFID tags that has an integrated microprocessor incorporating sophisticated encryption technology e.g. DES, 3DES or AES; the data contained therein may be susceptible to interrogation by a suitably equipped RFID reader without the knowledge of the holder of the credential.

It is possible to configure an RFID tag such that it can only be read when it is in close proximity to one or more suitably configured RF circuits. In the simplest embodiment two identically tuned RFID tags are configured such that the natural resonant frequency of the tags is out of the pass band of a RFID reader. When the tags are in close proximity, the coupling between the two antennas can lower the frequency of each antenna such that they both respond in the pass band of the reader (13.5-15.5 MHz). In this case the reader simultaneously recognizes two tags, and in the absence of mutual proximity of the two tags, the reader can be insensitive to the presence of the tags.

Embodiments of the present invention use the fact that adjacent RFID antennas can affect one another to provide security in a RFID device.

In one embodiment, in the normal position, the data from the RFID identification device can not be read. In another position of the identification device, the data can be read because of the change in the positioning of the RFID antennas.

The RFID-based identification device can be a wallet, a passport, an ID tag or the like.

One embodiment of the present invention is a RFID-based identification device 102 using a first RFID antenna 104 and a second RFID antenna 106. When the first and second RFID antennas are in a first arrangement such as that shown in FIG. 1A, the resonant frequencies of the antennas can be away from an interrogation frequency so that no identification information is transferred. When the first and second RFID antennas are in a second arrangement, such as shown in FIG. 1B, the resonant frequency of the identification device shifts such that identification information is transferred.

Figure 1A:
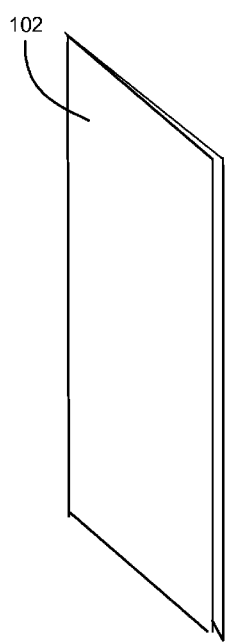
FIGS. 1A and 1B show an RFID identification device of one embodiment.
Figure 1B:
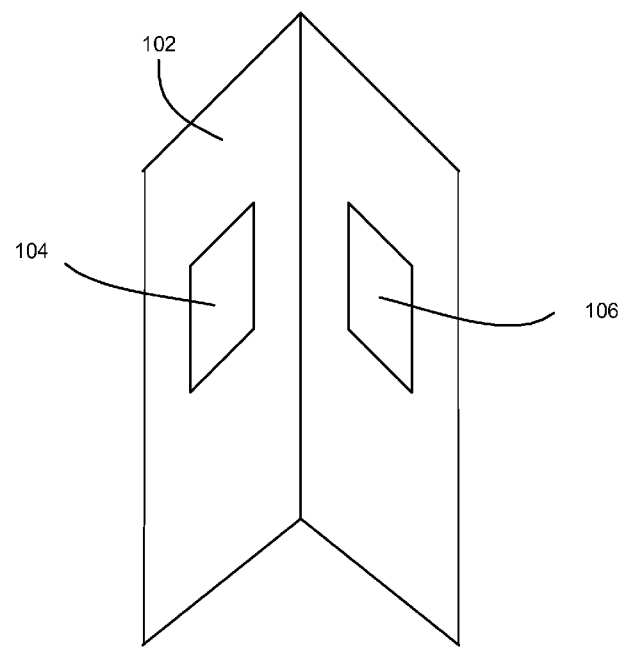

FIG. 1A shows the first arrangement with RFID antennas adjacent and FIG. 1B shows the second arrangement with the RFID antennas apart.

Alternately, the first arrangement can have the RFID antennas apart and the second arrangement can have the RFID antennas adjacent.

In one embodiment, the RFID-based identification device can fold, like a passport, between the first and second arrangement.

The first and second antennas can be operably connected. In one embodiment, the antennas are operably connected using a material such as the pages of a booklet. Alternately, the first and second antennas can be on different elements that are not connected.

Figure 4A:
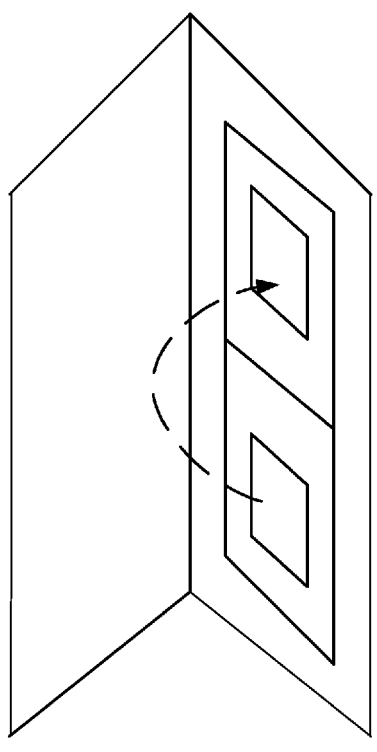
FIGS. 4A and 4B illustrate an embodiment that operates by folding.
Figure 4B:
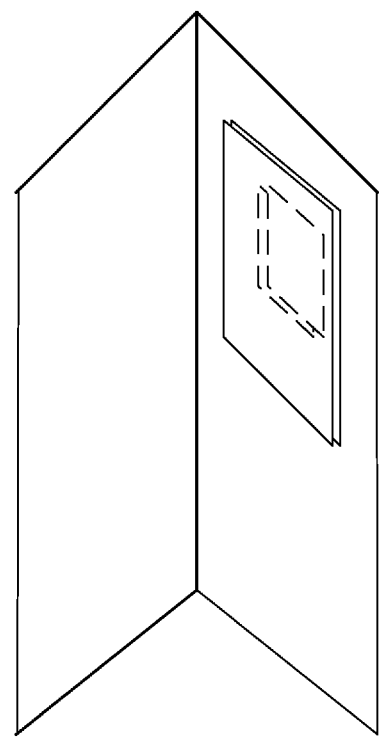

FIGS. 4A and 4B show another arrangement of the antennas. In this example, a page of a booklet, like a passport, folds up so that the first and second antennas are adjacent.

FIGS. 5A and 5B show an example where a section of the device including a first antenna 502 slides up to be adjacent to a second antenna 504.

Figure 6A:
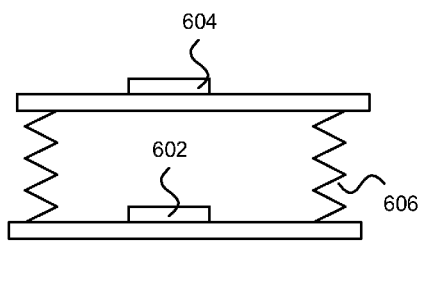
FIGS. 6A and 6B illustrate an embodiment that operates using a mechanical separator.
Figure 6B:
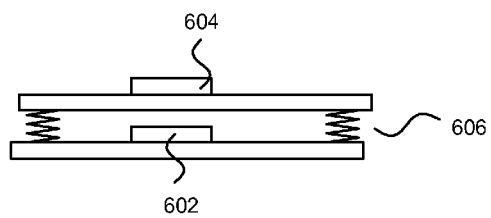

FIGS. 6A and 6B show an example where the first and second antennas 602 and 604 are separated by a mechanical separation apparatus 606.

In one embodiment, the first antenna 302 can be associated with a memory 304 and RFID tag and the second antenna 306 can be associated with a microprocessor 308 based RFID tag.

Figure 3A:
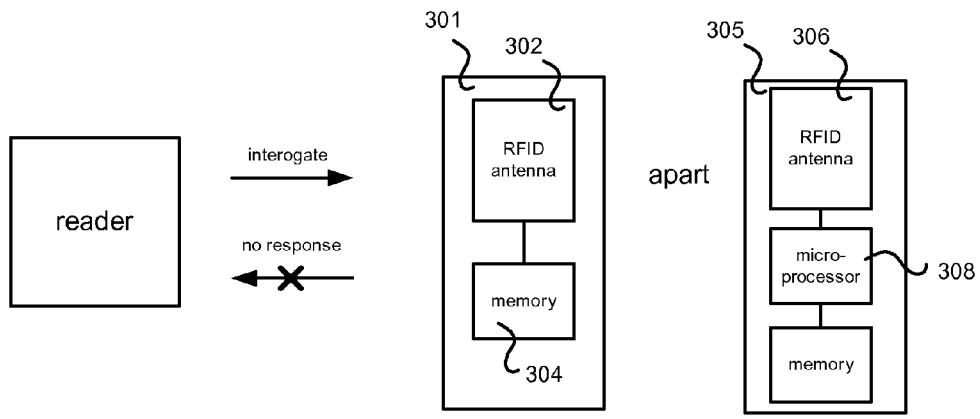
FIGS. 3A and 3B illustrate the operation of a system of one embodiment of the present invention.

As shown in FIG. 3A, when the first tag 301 is apart from the second tag 305, they will not respond in the operating frequency band of the reader, when integrated.

Figure 3B:
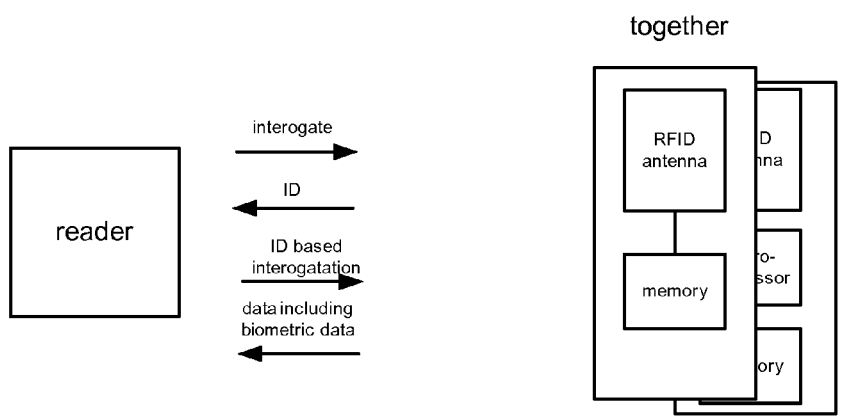

As shown in FIG. 3B, when the first tag 301 is adjacent to the second tag 308, integration 320 can be responded to with a response 302 from the first tag 301 including an ID or an encrypted version of the ID. The reader can the integrate tag 305 with an interrogation that includes the ID or an encrypted version of the ID. The tag 305 can then respond with data that includes the biometric data.

In this example, the use of the multiple interrogations further improves the security of the biometric data. When multiple tags are used, a collision protocol can be used.

Figure 2:
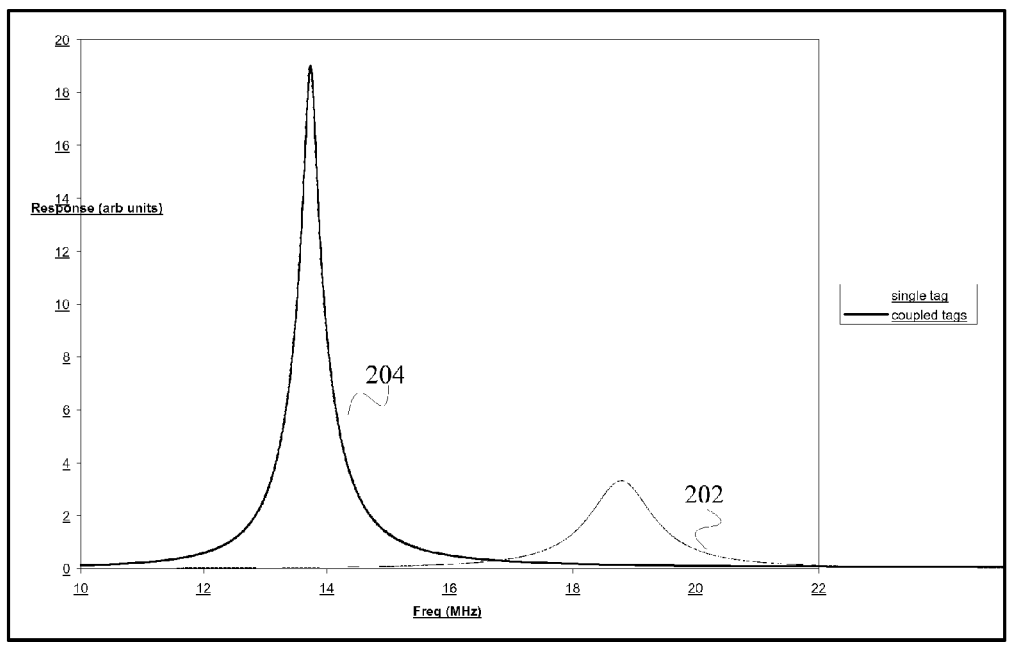
FIG. 2 is a diagram showing the operation of one embodiment.

In FIG. 2, the frequency response of one tag in isolation 202 and two coupled tags 204 are plotted, for one example. The degree of coupling is a function of the both the alignment of each tag to its fellow and of the distance between the tags. Note the change, both in frequency and amplitude, of the response, the paired tags allow not only for a response in the correct frequency range but also a robust response in the band and a poor response out of band. With proper design, to take advantage of this effect, the ability to read a tag out of band with a reader specifically designed to do so is significantly limited. This effect is greater at UHF frequencies (860-960 MHz), than at HF (13.56 MHz). The second circuit may or may not be another RFID tag, a properly configured antenna with an electrical loading circuit is sufficient to produce the effect.

The use of two identical RFID circuits also allows for an additional layer of security for biometric data that may be stored on a microprocessor based RFID card. The microprocessor application may be configured such that it only runs when the pair of RFID tags is present in the field of the reader. In essence, the paired RFID tags can act as an additional key to access the biometric data in a microprocessor tag.

The mechanical interface between the paired tags can be configured such that the tags are easily paired in the correct orientation to take advantage of the mutual coupling. The mechanical interlock may take a variety of forms including a hinged plastic card with properly configured tags, one in each half of card; a sliding tag such that one inlay slides over the second to allow alignment, or a mechanical separation apparatus in which the two tags are held aligned and plane parallel but at a distance apart that inhibits the mutual coupling.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A Radio Frequency Identification (RFID)-based identification device comprising:
    a first RFID antenna; and
    a second RFID antenna, wherein the first and second RFID antennas are in a first arrangement, the resonant frequencies of the antennas are away from an interrogation frequency such that no identification information is transferred, and wherein when the first and second RFID antennas are in a second arrangement, the resonant frequency of the identification device shifts such that identification information is transferred; and
    wherein the identification information includes biometric data.

2. The RFID-based identification device of claim 1, wherein the first arrangement has the RFID antennas apart and the second arrangement has the RFID antennas adjacent.

3. The RFID-based identification device of claim 1, wherein the first arrangement has the RFID antennas adjacent and the second arrangement has the RFID antennas apart.

4. The RFID-based identification device of claim 1, wherein the RFID-based identification device folds between the first and second arrangement.

5. The RFID identification device of claim 1, wherein the one of the first or second antennas is on a section that slides to be adjusted with the other antenna.

6. The RFID device of claim 1, wherein the first or second antenna are held apart by a mechanical apparatus on the first arrangement.

7. The RFID-based identification device of claim 1, wherein the first and second antenna are connected.

8. The RFID-based identification device of claim 1, wherein the first and second antennas are on different elements that are not connected.

9. The RFID-based identification device of claim 1, wherein a portion of the RFID identification information is stored associated with the first antenna and a portion of the RFID identification information is stored associated with the second antenna.

10. The Radio Frequency Identification (RFID)-based identification device of claim 1 wherein the first antenna is associated with a memory only tag and the second antenna is associated with a microprocessor based tag.

11. The RFID device of claim 10, in the second arrangement, wherein the memory only tag provides an ID that is used to interrogate the microprocessor based tag to get the biometric data.

12. A method comprising:
    maintaining a Radio Frequency Identification (RFID)-based identification device such that the first and second antennas are in a first arrangement with the resonant frequency of the antennas array from an identification frequency such that no identification information is transferred; and
    adjusting an RFID-based identification device such that the first and second antennas are in a second arrangement wherein the resonant frequency of the RFID-based illustration device is shifted such that identification information is transferred; and
    wherein the identification information includes biometric data.

13. The method of claim 12, wherein the first arrangement has the RFID antennas apart and the second arrangement has the RFID antennas adjacent.

14. The method of claim 12, wherein the first arrangement has the RFID antennas adjacent and the second arrangement has the RFID antennas apart.

15. The method of claim 12, wherein the RFID-based identification device folds between the first and second arrangement.

16. The method of claim 12, wherein the first and second antenna are connected.

17. The method of claim 12, wherein the first and second antennas are on different elements that are not connected.

18. The method of claim 12, wherein a portion of the RFID identification information is stored associated with the first antenna and a portion of the RFID identification information is stored associated with the second antenna.

19. The RFID identification device of claim 12, wherein the one of the first or second antennas is on a section that slides to be adjusted with the other antenna.

20. The RFID device of claim 12, wherein the first or second antenna are held apart by a mechanical apparatus on the first arrangement.

21. The RFID-based identification device of claim 12, wherein the first antenna is associated with a memory only tag and the second antenna is associated with a microprocessor based tag.

22. The RFID device of claim 21, in the second arrangement, wherein the memory only tag provides an ID that is used to interrogate the microprocessor based tag to get the biometric data.

* * * * *